Oct. 27, 1970 R. H. McMANN, JR 3,536,826

VERTICAL APERTURE CORRECTION APPARATUS

Filed Oct. 5, 1966 2 Sheets-Sheet 1

INVENTOR.
RENVILLE H. McMANN, JR.

BY Brumbaugh, Free, Graves & Donohue his ATTORNEYS

INVENTOR.
RENVILLE H. McMANN, JR.
BY
Brumbaugh, Free, Graves & Donohue
his ATTORNEYS United States Patent Office 3,536,826
Patented Oct. 27, 1970

3,536,826
VERTICAL APERTURE CORRECTION APPARATUS

Renville H. McMann, Jr., Stamford, Conn., assignor to Columbia Broadcasting System, Inc., New York, N.Y., a corporation of New York Filed Oct. 5, 1966, Ser. No. 584,385
Int. Cl. H04n 5/14
U.S. Cl. 178—5.4 20 Claims

ABSTRACT OF THE DISCLOSURE

An arrangement for the correction of vertical aperture defects, including a vertical aperture correction circuit which derives a signal representative of vertical detail. The vertical detail signal is combined with a main signal (the luminance signal in typical color television systems) to enhance the vertical detail content for any given line scanned by a camera tube. Line component signals are delayed a time corresponding to one scanned line, before employment as main line component signals. The aperture correction circuit includes two difference amplifiers which subtract signals delayed two lines, and undelayed signals, respectively, from the main line signals. A summing amplifier combines the difference signals from the difference amplifiers to provide signals corresponding to the vertical detail in the main line. The main line component signals are passed to a DC restorer and a gamma control unit, and are subsequently enhanced by addition of the vertical detail signals. Before addition to the main line component signals, the vertical detail signals are first crispened, and then modulated with reference to the amplitude of the main line component signals to preclude blacker-than-black, and whiter-than-white overshoots when the vertical detail is added to the main line signal.

Figure 1:
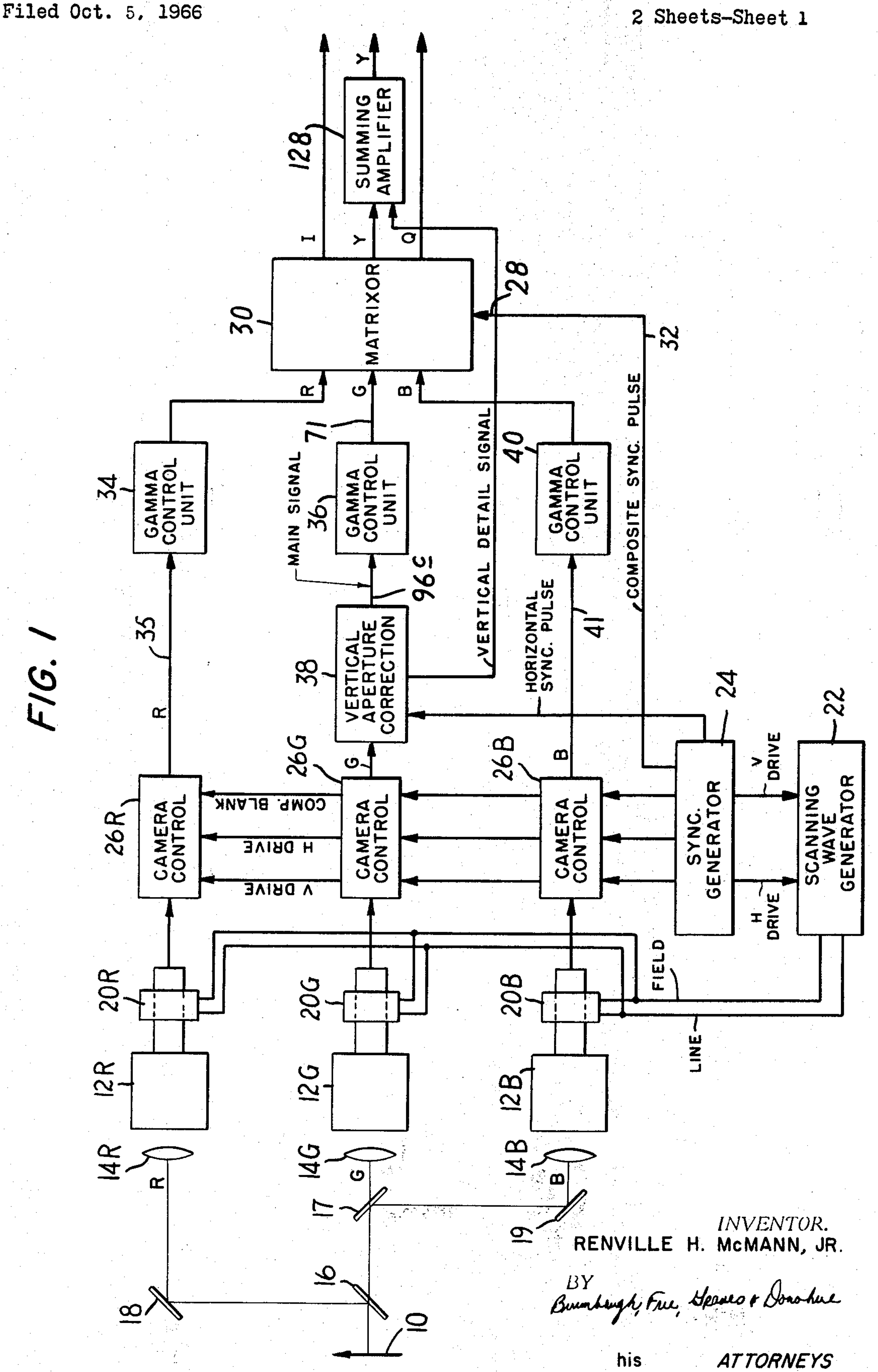

This invention relates to television apparatus and, more particularly, to apparatus for the correction of optical aperture defects inherent in the scanning line structure of television pick-up devices.

In television transmission and reproduction of images a distortion known as aperture distortion arises from the use of a scanning spot of finite size. As a consequence of the response of the system to the average light intensity within the image area covered by the spot at any instant, the sharpness of image borderlines of high contrast is reduced. Heretofore, aperture correction circuits have been proposed which compensate the derived television information signal for the spread of information to and from the scanned picture element by delaying the derived television information signal by one field scansion to coincidentally align the picture elements of alternate fields and the subtracting the delayed signal from the normal or undelayed signal to cancel the information spread between fields. Such systems, however require devices providing highly accurate time delays of one field, or 16,667 microseconds, which are not available.

Furthermore, prior attempts to devise vertical aperture correction circuits employing one or two line (63.5 or 127 microseconds) delays for subtraction of portions of successive lines to obtain a vertical correction signal have not been successful for several reasons. For example, such arrangements quite often result in whiter-than-white overshoots and blacker-than-black overshoots and introduce noise. In color television systems, moreover, such correction, when applied subsequent to the gamma correction of the different color component signals, not only result in an improper amount of equalization being introduced into the system but also cause noise stretch in the low amplitude regions which will distort the correction signal.

Accordingly, it is an object of the present invention to provide vertical aperture correction apparatus which overcomes the above-mentioned disadvantages of the prior art.

A further object of the present invention is to provide aperture correction apparatus for television systems which corrects the information signal for the vertical spread of information from adjacent vertical areas without causing improper equalization or distortion resulting from noise stretching.

It is another object of the present invention to provide vertical aperture correction apparatus for a color television system wherein the vertical correction signal derived by the vertical aperture correction apparatus is proportional to the amplitude of the video signal.

It is still another object of the present invention to provide a vertical aperture correction apparatus wherein blacker-than-black and whiter-than-white overshoots are effectively prevented without substantially influencing the principal luminance component.

Another object of the invention is to provide novel vertical aperture correction apparatus wherein vertical resolution can be improved without substantially increasing noise.

These and other objects of the invention are accomplished by providing a vertical aperture correction apparatus which separates a derived television signal into a main line component and adjacent line components, subtracts the adjacent line components from the main line component and combines the difference signals to produce a vertical correction signal. Preferably, before combining the vertical correction signal with the main line component of the video signal to produce a vertically equalized signal, the correction signal is amplitude modulated by the main line component of the video signal which is passed through an amplitude sensitive modulation circuit. The modulation of the correction signal by the main line component signal is accomplished in such fashion as to make certain that blacker-than-black or whiter-than-white overshoots are not developed when the two signals are combined to produce a vertically equalized signal.

In one embodiment of a television system according to the invention, the above-described vertical aperture correction apparatus is incorporated into the green channel of a color television system prior to gamma correction. The main line component of the green signal is gamma corrected but the vertical correction signal produced by the apparatus is passed around the gamma correction circuit for combination with the luminance or Y signal in the encoder. In bypassing the gamma circuit, the vertical correction signal is maintained representative of the amplitude of the derived green component signal so that the correction signal, and hence the noise, is reduced in the black areas of the picture.

Figure 2:
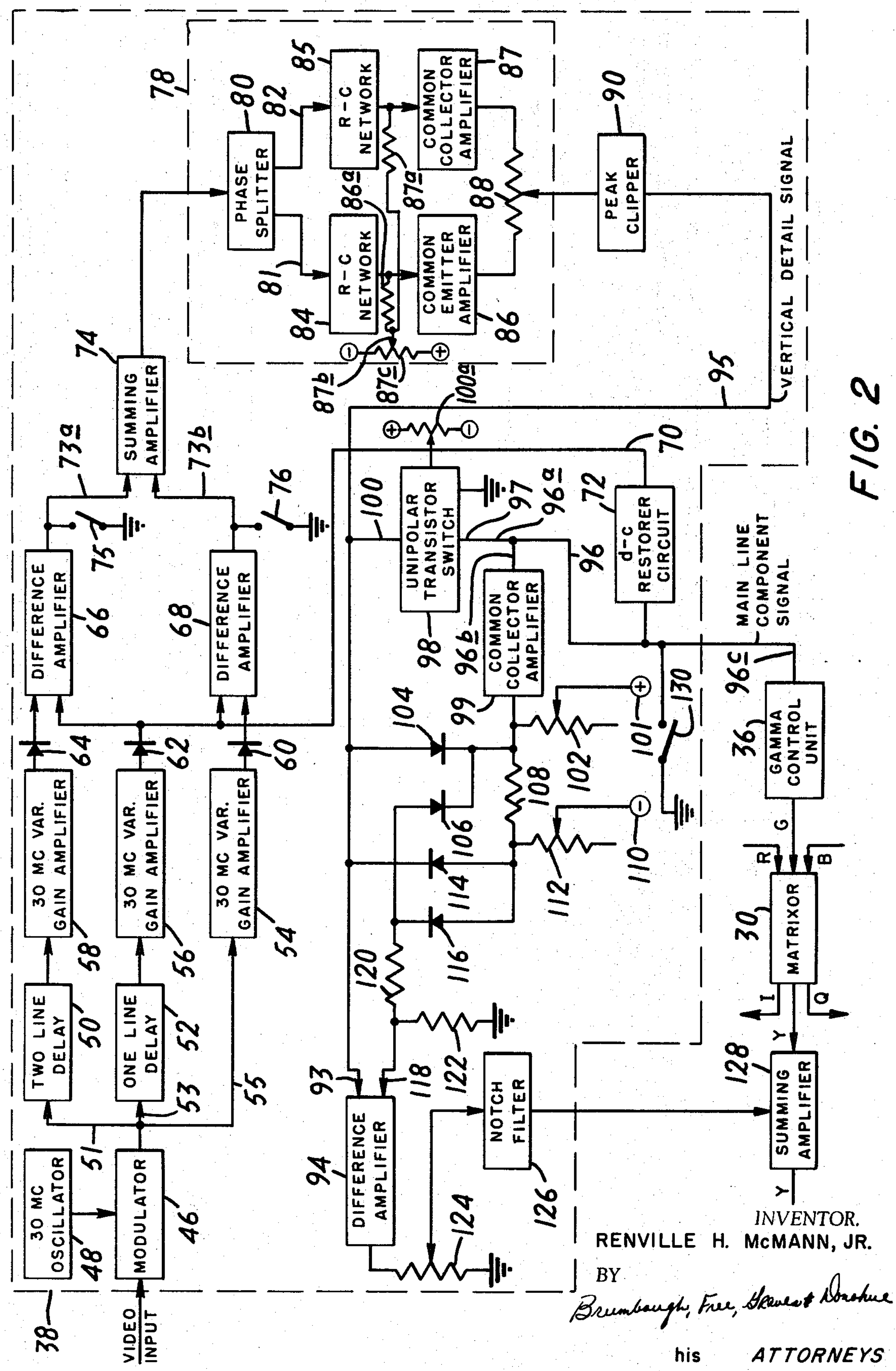

Further objects and advantages of the invention will be apparent from the reading of the following description of specific embodiments thereof taken in conjunction with the accompanying drawings, in which:

FIG. 1 is a schematic block diagram illustrating the arrangement of one embodiment of a color television system employing the vertical aperture correction apparatus of the invention; and FIG. 2 is a schematic block diagram illustrating the arrangement of one embodiment of the vertical aperture correction apparatus used in the system of FIG. 1.

In a representative color television system according to the present invention, as shown in FIG. 1, an object field 10 is scanned by a color television camera of the simultaneous type. As shown, the camera includes three scanning devices 12R, 12G and 12B, of the image orthicon type, with cooperating lenses 14R, 14G and 14B, respectively, which focus images of the object field 10 on the light-sensitive surfaces of the scanning devices 12R, 12G and 12B. Between the lenses 14R, 14G and 14B and the object field 10 are interposed color selective dichroic mirrors 16, 17, 18 and 19 which direct the light from the object field 10 along three separate color paths, as indicated by the labeled lines, such that the red, green and blue light components enter the camera tubes 12R, 12G and 12B, respectively.

The scanning beams in the tubes 12R, 12G and 12B are deflected in the line and field directions by suitable scanning yokes 20R, 20G, and 20B, respectively, energized simultaneously with suitable sawtooth field and line scanning waves generated by a scanning wave generator 22. A synchronizing generator 24 generates the suitable vertical and horizontal drive pulses which are applied to the scanning wave generator 22 and to the camera control units 26R, 26G and 26B associated with the camera tubes 12R, 12G and 12B, respectively. The relationship between the horizontal and vertical drive pulses is selected to yield a 525 line double-interlaced picture in accordance with conventional television transmission standards and, more particularly, a vertical drive frequency of nominally 60 cycles and horizontal drive frequency of 15,750 cycles.

The synchronizing generator 24 also develops composite blanking and composite sync signals in the usual manner, the composite blanking signals being applied to the three camera control units, as indicated by the labeled lines, and the composite sync pulses being applied to the input terminal 28 of a matrixor 30 through a conductor 32. The camera control units 26R, 26G and 26B, in response to the signals generated by the synchronizing generator 24 and the video signals produced by the camera tubes 12R, 12G and 12B, provide signals corresponding to the different primary color components of the object field 10 during each field scansion.

The signal relating to the red component of the object field 10 is further combined with the proper line and field blanking signals in the camera control unit 26R and applied to a gamma control unit 34 through a conductor 35; the signal relating to the green component of the object field 10 is combined with the proper line and field blanking signals in the camera control unit 26G and applied to a gamma control unit 36 through a vertical aperture correction circuit 38; and the signal relating to the blue component of the object field 10 is combined with the proper line and field blanking signals in the camera control unit 26B and applied to a gamma control unit 40 through a conductor 41. The gamma control units 34, 36 and 40 are required to compensate the different color component signals for the curved transfer characteristics of reproducing kinescopes employed in conventional color television systems. The gamma control units 34, 36 and 40 stretch the low amplitude levels of the color component signals to compensate for the non-linear stretching of the middle to high amplitude levels of the color component signals by the reproducing kinescope. Addition of gamma correction provides for the reproduction of images which correctly correspond to the proper luminance and chrominance signals of the object field 10.

The vertical aperture correction circuit 38 is employed in the green channel in order to correct the derived green component signal for aperture distortion inherent in the camera tube 12G. Moreover, because the vertical aperture correction apparatus is suitable for use not only in the main transmission channel of a color television system, but also in all three channels of a color television system, or in just the green channel of a color television system as in the embodiment shown in FIG. 1, it is described separately hereinafter with reference to FIG. 2.

As shown in FIG. 2, an incoming video signal is applied within the vertical aperture correction unit 38 to a modulator 46 and modulated therein onto a 30 megacycle carrier provided by a 30 megacycle (mc.) oscillator 48. From the modulator 46, the signal is applied simultaneously to the input terminal of a two line delay line 50 through a conductor 51, to the input terminal of a one line delay line 52 through a conductor 53 and to the input terminal of a 30 mc. variable gain amplifier 54 through a conductor 55. The two line delay line 50 delays the input video signal for a period of two lines or 127 microseconds, and the one line delay line 52 delays the input video signal for a period of 63.5 microseconds or one line. It is noteworthy that, by introducing time delays corresponding to one and two lines of scanned image area, three adjacent line components of the video signal are aligned with respect to time for each field scansion. For example, lines 5, 3 and 1 are present simultaneously at the conductor 55 and the output terminals of delay lines 52 and 50, respectively, followed by lines 7, 5 and 3, and then lines 9, 7 and 5, during each odd field scansion and lines 6, 4 and 2 and then 8, 6 and 4, etc. are present simultaneously at the conductor 55 and the output terminals of the delay lines 52 and 50, respectively, during each even field scansion.

While various types of delay lines may be employed in the present invention, delay lines which contain glass as the transmission medium are preferred for use in the present invention. It is the operational characteristics of such delay lines which require the modulation of the video signal onto the 30 mc. carrier. The employment of the high frequency modulation facilitates the acoustic matching of the transmission medium of the delays 50 and 52 with the transducers thereof and, accordingly, reduces the insertion loss and magnitude of the secondary responses.

As can be appreciated, it is essential that the once- and twice-delayed line components of the video signal be accurately timed with respect to the undelayed line component, requiring, for example, a tolerance of 0.05 microsecond or about one-half of a picture element in the delay operation. This may be accomplished in any well-known manner, such as, for example, by accurately cutting each delay line to the proper length. As an alternative method, the delays 50 and 52 may be controlled by horizontal sync pulses or the like generated by a synchronous or non-synchronous generator.

Thereupon, the once-delayed component of the video signal, which will become the main line component, and the twice-delayed line component of the video signal are applied to two further 30 mc. variable gain amplifiers 56 and 58, respectively. As mentioned above, the undelayed line component of the signal is applied to the 30 mc. variable gain amplifier 54. As will be explained hereinbelow, the modulation, amplification and demodulation of the three adjacent line component signals of the video signal increases the stability of operation by reducing the amount of drift between these three component signals. The amplifiers 54, 56 and 58 may be of the conventional television IF amplifier type, the amplifiers 56 and 58 correcting for the attenuation of the once- and twice-delayed line component signals by the delay lines 52 and 50, respectively. If desired, an attenuator may be inserted in series with the conductor 55 so as to achieve the maximum amount of similarity between the undelayed line component signals and the once- and twice-delayed line component signals. From the 30 mc. amplifiers 54, 56 and 58, the undelayed and once- and twice-delayed line component signals are separately detected by a trio of diodes 60, 62, and 64, respectively.

After detection, the twice-delayed line component of the video signal and the once-delayed line component of the video signal are applied to the input terminals of a difference amplifier 66 wherein the proper amount of the twice-delayed line component signal is subtracted from the once-delayed line component signal. Similarly, the once-delayed line component signal and the undelayed line component signal are applied to the input terminals of a second difference amplifier 68 wherein the proper amount of the undelayed line component signal is subtracted from the once-delayed line component signal. Further coupled to the diode 62 through a conductor 70 is a D-C restorer circuit 72. It is significant that in order to achieve optimum results, the undelayed line component signal is amplified and detected in the same manner as the undelayed and twice-delayed line component signals. This insures that the line component signals being compared in the amplifiers 66 and 68 will have undergone the same unavoidable distortions in the modulation-demodulations process, thus preventing the generation of false detail signals.

The difference signal outputs from the amplifiers 66 and 68 are then fed through corresponding conductors 73*a* and 73*b* to a summing amplifier 74 wherein the signals are added to produce a signal containing vertical detail only, i.e., a signal representing only the differences between the adjacent lines. This results because all true horizontal information for large areas, being the same for adjacent lines, will be cancelled in the amplifiers 66 and 68. The operation of the difference amplifiers 66 and 68 and the summing amplifier 74 is analogous to the correction of a linearly distorted signal by adding proportions of its own successive derivatives.

Connected to the conductors 73*a* and 73*b* are a pair of ground-connected test switches 75 and 76, respectively, which are provided for the calibration of the operational levels of the variable gain amplifiers 54 and 58. As mentioned above, all true horizontal information for large areas on adjacent lines is identical. Hence, in order to calibrate and fix the gain of the amplifier 58, the switch 76 is connected to ground and the gain of the amplifier 58 is increased until a sufficient amount of the twice-delayed line component signal is subtracted from the once-delayed line component signal to cancel the output from the difference amplifier 66. In order to calibrate the gain of the amplifier 54, the conductor 73*a* is connected to ground by the closing of the switch 75 and the gain of the amplifier 54 is increased until a sufficient amount of the undelayed line component signal is subtracted from the once-delayed line component signal to cancel the output of the difference amplifier 68. The inclusion of the switches 75 and 76 (and the switch 130 described hereinbelow) constitutes an important feature of the instant invention inasmuch as the switches enable the system to be calibrated using only a monitor, obviating any requirement for an oscilloscope.

From the summing amplifier 74, the vertical detail signal is applied to a crispener circuit 78, shown in the dashed lines, which includes a phase splitter 80 for producing an inverted signal output at a terminal 81 and an in-phase signal at a terminal 82 and R-C networks 84 and 85 connected to the output terminals 81 and 82, respectively. The time constants of the R-C networks 84 and 85 are selected so that identical signal shaping is performed on both the inverted and in-phase detail signals. Further included within the crispener circuit are a common emitter amplifier 86 and a common collector amplifier 87 having their input terminals coupled to the networks 84 and 85, respectively, and having their output terminals coupled together across a potentiometer 88.

The crispener circuit 78 is provided to sharpen the detail signals and the generate properly proportioned detail signals being substantially free from noise spikes. Such action is implemented by adjustably biasing the amplifiers 86 and 87 so as to set an adjustable threshold which the detail signal must exceed before an output signal is available from the potentiometer. Adjustable bias for this purpose may be provided by connecting the input terminals of the amplifiers 86 and 87 through the resistors 86*a* and 87*a* to an adjustable contact 87*b* on a potentiometer 87*c* across which a suitable potential difference is maintained. By adjustment of the position of the contact 87*b*, the threshold can be set to a level which prevents noise from getting through to the potentiometer 88 but permits substantially all of the detail signal to pass.

The inverted and shaped vertical detail signal is inverted and amplified again by the amplifier 86 and recombined with the in-phase detail signal in the potentiometer 88. It will be understood that the adjustment of potentiometer 88 is dependent upon the requirements of the system wherein the crispener 78 is employed. For greater positive detail, the potentiometer 88 is adjusted to reduce the amount of signal loss in the output of the amplifier 86. For greater negative detail, the potentiometer is adjusted to reduce the amount of signal loss in the output of the amplifier 87.

Thereafter, the properly proportioned vertical detail signal is applied to a peak clipper circuit 90 which limits the maximum amplitude of the detail signal in the black and white directions. The clipper is set to limit the detail signal on large amplitude transitions to a value which does not go blacker-than-black or whiter-than-white and to pass the vertical detail signal without clipping in the low, middle and high amplitude regions. From the clipper circuit 90, the detail signal is coupled to one input terminal 93 of a difference amplifier 94 through a conductor 95.

As mentioned above, the main line component signal is applied to the D-C restorer circuit 72 at the same time the signal is applied to the difference amplifiers 66 and 68. The D-C restorer circuit inserts the appropriate black level of the video signal into the main line component signal as is done in conventional television procedure. A D-C restorer circuit of either the peak rectifier type or the keyed clamp type may be utilized in the instant invention. After D-C restoration, the main line component signal is applied through a conductor 96 and its branch conductor 96*a*, to the control electrode 97 of a unipolar transistor 98 which is adjustably biased from a suitable source 100*a*. Conductors 96*b* and 96*c* further couple the main line component signal to a common collector amplifier 99 and to the gamma control unit 36 outside the unit 38 (FIG. 1), respectively. Another electrode 100 of the transistor 98 is connected to the conductor 95, the conductor 95 coupling the vertical detail signal to the difference amplifier 94.

The transistor 98 is biased in such a manner that whenever the D-C restored main line component signal applied to the electrode 97 contains black and blacker-than-black amplitude level portions, the transistor is operative to short the vertical detail signal in the connector 95 to ground. The rationale behind the shorting of the detail signal to ground at these amplitude levels of the main signal lies in the fact that vertical aperture correction is required to compensate for the spread of information to and from a scanned picture element. For dark areas and corresponding black amplitude levels of the derived main line component signal, the noise component of the signal is ordinarily high, thus obviating any need for vertical aperture correction. Although a unipolar transistor has been used as the amplitude dependent shorting switch in the arrangement of FIG. 2, it should be understood that other types of switches, equally known in the art, may be employed in the present invention whose action may be either abrupt or gradual as a function of signal level.

As will be explained in detail hereinbelow, the vertical detail signal is added to the luminance or Y signal in order to enhance the vertical detail of that signal. While the crispener circuit 78 and the peak clipper 90 remove a certain amount of black and white amplitude overshoot in the detail signal, additional signal correction is required to make certain that the vertical detail signal does not produce blacker-than-black overshoots and whiter-than-white overshoots when added to the luminance signal. A modulation circuit is therefore provided which includes the common collector amplifier 99, the output of which is coupled to a source of positive potential through a rheostat 102 and to the cathodes of a pair of parallel-connected diodes 104 and 106. Further included are a resistor 108 which further couples the output of the common collector amplifier 99 to a source of negative potential 110 through a rheostat 112 and to the anodes of a pair of parallel-connected diodes 114 and 116. The anode of the diode 104 and the cathode of the diode 114 are connected together and to the first input terminal 93 of the difference amplifier 94. The other input terminal 118 of the amplifier 94 is coupled through a pair of series-connected resistors 120 and 122 to the cathode of the diode 116 and to the anode of the diode 106.

In the modulation circuit, the D.C. restored main line component signal is amplified by the common collector amplifier 99. Thereafter, the main line component signal is supplied through the diode 104 to the vertical detail signal in the conductor 95 and to the second input terminal 93 of the difference amplifier 94. Because of the biasing of the diode 104, the main line component signal modulates or clips the vertical detail signal whenever the amplitude of the vertical detail signal is more positive than the main line component signal. In effect, therefore, the amplitude of the vertical detail signal is prevented from exceeding the level which, when added to the luminance signal, will cause blacker-than-black amplitude levels. Because of the positive clamping of the main line component signal and the resistors 120 and 122, the diode 106 remains non-conductive and the difference amplifier 94 produces a signal output representative of the modulated or clipped vertical detail signal only. It is significant that clipping of the vertical detail signal by the positively clamped main line component is provided without adversely affecting the main line component signal itself. This assures that a proper luminance signal will always be generated without regard to the amount of vertical detail added to the luminance signal.

Concurrent with its application to the diodes 104 and 106, the amplified main line component signal is also supplied through the diode 114 to the vertical detail signal in the connector 95 whenever the amplitude of the main line component signal is more positive than the amplitude of the detail signal. By varying the setting of the rheostat 112, diode 114 may be reverse biased to any suitable degree. This in turn determines the extent or amount of negative amplitude clipping to be performed on the vertical detail signal. The negative amplitude portions of the detail signal are thereby prevented from exceeding a value which, when added to the luminance signal, will cause whiter-than-white amplitude levels. Moreover, the diode 116 is biased in such a manner that it remains non-conductive so long as a signal is present in the conductor 95. This prevents cancellation of the vertical detail signal by the clamped main line component signal in the amplifier 94.

The difference amplifier 94 and the diodes 106 and 116 are provided to insure against the addition of portions of the main line component signal to the luminance signal during the absence of a vertical detail signal or whenever such a detail signal is shorted to ground through the unipolar transistor switch 98. As mentioned above, the vertical detail signal is shorted to ground whenever the main line component signal contains blacker-than-black amplitude portions. But for the inclusion of the diodes 106 and 116, it can be seen that portions of the main line component signal would be transmitted through the diodes 104 and 114, amplified and subsequently added into the luminance signal. When the conductor 95 does not contain detail and the main line component signal contains negative amplitude portions, both diodes 104 and 106 conductively couple the same portions to both input terminals 93 and 118 of the amplifier 94. In the amplifier 94 the two signals are subtracted from each other and cancelled. When only positive amplitude portions of the main line component signal are present, the diodes 114 and 116 transmit these portions to the difference amplifier 94 and, again, these signals are cancelled therein. The pair of resistors 120 and 122 provide the proper biasing such that the diodes 106 and 116 are operative only during the absence of a vertical detail signal.

After amplification by the amplifier 94, the vertical detail signal is applied through a potentiometer 124 and a notch filter 126 to a summing amplifier 128 wherein the detail signal is combined with the luminance or Y signal. By adjustment of the potentiometer 124, the proper amount of vertical detail signal may be added to the luminance signal and, thus, a luminance signal which contains optimum vertical correction will be generated by the amplifier 128. The notch filter 126 is of conventional construction and designed to pass all frequencies except those around 3.6 megacycles. In color television, the 3.6 megacycle per second color subcarrier reverses polarity each line and consequently appears as a vertical detail signal. If this signal were transmitted, vertical aperture correction would increase the chroma as it increased the vertical sharpness. Accordingly, the filter 82 removes the 3.6 megacycle color subcarrier. It should further be noted that increasing the amount of vertical detail signal to be added to the luminance signal does not materially increase the signal-to-signal noise ratio of the corrected luminance signal. This is true because the filter 126 removes the high frequency noise signals from the vertical detail signal and the crispener circuit 78 removes the noise components of smaller amplitude than the minimum detail signal.

A further ground-connected test switch 130 is provided in the branch conductor 96c to cut off the main signal when required for testing purposes and to calibrate the operational level of the variable gain amplifier 56. As mentioned above, the inclusion of the ground-connected switch 130, as well as the ground-connected switches 75 and 76 enable the system to be tested and calibrated using an ordinary television monitor and without the aid of an oscilloscope.

After vertical aperture correction in the unit 38 and gamma correction in the unit 36, the main line components of the green color information signal are applied, as shown in FIG. 1, to the matrixor 30 wherein the components are combined with the proper sync pulses applied to the matrixor 30 from the generator 24 through the conductor 32. The gamma corrected red and blue component signals are similarly applied to the matrixor 30 from the gamma control units 34 and 40, respectively, and combined in the matrixor with the green component signals and each other in a suitable manner to produce the standard luminance or Y signals and the standard chrominance or I and Q signals.

Then the luminance signal is applied to the summing amplifier 128 wherein properly weighted vertical detail signals produced by the correction circuit 38 are added to the luminance signal to provide luminance signals containing vertical aperture correction or enhancement proportional to signal amplitude. In other words, the amount of vertical correction is dependent upon the original amplitude of the main line component green signal rather than on the stretched low amplitude levels of the green color component signal. If the vertical detail signal had been passed through the gamma control unit 36 or if the vertical aperture correction circuit 38 had been inserted into the green channel after the gamma control unit 36, the stretching of the vertical detail signals in the low amplitude portions would have distorted the resulting vertically corrected component signals and produced more correction than is normally desired in the lower amplitude regions of the delayed or main line component signals.

It will be noted that the green component signal lags the red and blue component signals by the length of time it takes to scan one image line or 63.5 microseconds. This causes no difficulty because the camera can be adjusted to bring the blue and red signals into registration with the delayed green image. If desired, one line delay lines, of the type above described, may be inserted into the red and blue channels in order to align the line component of all three different color signals. From the above, it is further noticeable that it is not necessary to insert vertical aperture correction into each of three different color channels. This is true because the detail of the reproduced image is dependent upon the luminance signal, of which the green component signal constitutes the greatest proportionate amount.

In operation, the red, green and blue color components of the television information signal are developed in the camera control units 26R, 26G and 26B during each field scansion and applied to the gamma control unit 34, the vertical aperture correction circuit 38 and the gamma control unit 40, respectively. Within the vertical aperture correction circuit 38 there are produced vertical detail signals for combination with the luminance signal in the summing amplifier 128 and main line green component signals which are applied to the gamma control unit 36. After gamma correction of the red and blue color signals and gamma correction of the lagging main line component signals of the green color signal, the red, blue and green signals are combined in a suitable manner by addition and subtraction in the matrixor 30 to produce the standard Y, I and Q signals. Thereupon, the Y signal is applied to the summing amplifier 128 wherein a luminance signal is produced which contains an optimum amount of vertical equalization.

It will be understood that the invention is susceptible to considerable modification and not limited to the above described illustrative embodiment. For example, an unprocessed video signal alone may be, employed to modulate the vertical detail signal in order to make certain that the luminance signal will not include blacker-than-black and whiter-than-white overshoots when combined with the vertical detail signals. Also, due to the presence of the low pass filter 126, the normal NTSC signal can be processed through this correction circuit inasmuch as the chroma subcarrier will have been removed. Furthermore, the above-described vertical aperture correction apparatus may be employed in all three color channels of a standard color television system and may be employed in the main transmission channel of a black-and-white television system. Accordingly, all modifications and variations within the skill of the art are included within the spirit and intended scope of the invention as defined by the following claims.

I claim:

1. Vertical aperture correction apparatus comprising delay means for separating a television information signal into a main component signal and adjacent component signals to thereby coincidentally align adjacent picture elements, difference amplifier means responsive to the main component signal and the adjacent component signals for providing difference signals between the main component signal and the adjacent component signals, combining means responsive to the difference signals for combining the difference signals to thereby provide a vertical detail signal and second combining means responsive to the main component signal and the vertical detail signal for providing a vertically equalized main component signal.

2. Vertical aperture correction apparatus according to claim 1 including modulation means responsive to the amplitude of the main component signal for limiting the magnitude of the vertical detail signal to predetermined amplitude level to thereby prevent the development of blacker-than-black and whiter-than-white amplitude overshoots in the second combining means.

3. Vertical aperture correction apparatus according to claim 2 wherein the delay means comprises delay lines for separating the television information signal into a once-delayed main line component signal, a twice-delayed line component signal and an undelayed line component signal thereby coincidentially align the picture elements of three successive scanning lines.

4. Vertical aperture correction apparatus according to claim 3 further including second modulation means for modulating the television information signal onto a high frequency carrier to thereby improve the operational response of the delay means, amplifier means for amplifying the modulated undelayed, once-delayed and twice-delayed line component signals to thereby correct for the signal attenuation introduced by the delay means, detection means for separately detecting the undelayed, once-delayed and twice-delayed line component signals, and means preceding the difference signal providing means for branching the once-delayed line component signal to the first-mentioned modulating means for modulation of the detail signal and to the second combining means for vertical equalization.

5. Vertical aperture correction apparatus according to claim 4 wherein the difference amplifier means includes means for removing proper amounts of the detected twice-delayed and the undelayed line component signals from the detected once-delayed main line component signal to thereby provide differencce signals corresponding to the vertical detail between the detected main line component signal and the detected twice-delayed and the undelayed line component signals.

6. Vertical aperture correction apparatus according to claim 5 further including crispener means coupled to the combining means for increasing the vertical definition of the vertical detail signal without substanitally increasing noise.

7. Vertical aperture correction apparatus according to claim 5 including clipping means responsive to the vertical detail signal for preventing over-emphasis of large vertical signal transitions.

8. Vertical aperture correction apparatus according to claim 5 further including restorer means responsive to the detected once-delayed main line component signal for inserting the appropriate black amplitude level of the television information signal into the main line component signal prior to the amplitude limiting of the vertical detail signal by the main component signal responsive modulation means.

9. Vertical aperture correction apparatus according to claim 8 further including means responsive to low light level amplitude portions of the restored main line component signal for preventing the addition of vertical detail to the black and blacker-than-black amplitude portions of the main line component signal.

10. Vertical aperture correction apparatus according to claim 9 wherein the modulation means includes biasing means, diode means responsive to the biasing means and to main line component signal for clipping large amplitude excursions of the vertical detail signal in the black and white directions and amplifier means responsive to the clipped vertical detail signal for amplifying the detail signal prior to combination with the main line component signal in the second combining means.

11. Vertical aperture correction apparatus according to claim 10 wherein amplifier means includes difference amplifier means and wherein the diode means includes means for coupling the main line component signal to both input terminals of the difference amplifier means to thereby cancel the main line component signal and prevent the generation of a false deail signal by the amplifier means.

12. Vertical aperture correction apparatus according to the claim 11 including notch filter means coupled to the amplifier means for removing signals at frequencies of approximately 3.6 megacycles per second from the amplified amplitude limited vertical detail signal prior to combination with the restored main line component signal.

13. Vertical aperture correction apparatus according to claim 3 further including switch means connected to the difference amplifier means for selectively comparing the undelayed, once-delayed and twice-delayed component signals, respectively.

14. Vertical aperture correction apparatus according to claim 1 including gamma correction means responsive to the main component signal for stretching the signal in the low amplitude portions thereof, and wherein the second combining means is responsive to the gamma corrected main component signal and to the vertical detail signal for providing a vertically equalized main component signal.

15. Apparatus for developing color television signals comprising input means for developing color signals corresponding to different color components of an object field, vertical aperture correction means responsive to at least one of the color signals for providing main line component signals and vertical detail signals corresponding to the vertical information present between the main line component signals and adjacent line component signals, gamma correction means responsive to the main line component signals and to the color signals for stretching the color signals and the main line component signals in the low amplitude portions thereof, matrixor means responsive to the main line component signals and to the color signals for combining the signals to thereby provide luminance and chrominance signals and combining means responsive to the luminance signals and to the vertical detail signals for combining the signals to thereby provide vertically equalized luminance signals.

16. Apparatus according to claim 15 wherein the vertical aperture correction means includes means responsive to the color signal corresponding to the green component of the object field for providing main line green component signals which lag the corresponding line components of the red and blue color component signals by the period of time it takes to scan one image line.

17. Apparatus according to claim 16 wherein the vertical aperture correction means comprises delay means for separating the green color signals into undelayed, once-delayed and twice-delayed line component signals to thereby coincidentally align the picture elements of three successive scanning lines, difference amplifier means responsive to the once-delayed line component signals and to the undelayed and twice-delayed line component signals for providing difference signals between the once-delayed line component signals and the undelayed and twice-delayed line component signals and further combining means responsive to the difference signals for providing vertical detail signals, the vertical detail signals bypassing the gamma correction means and the matrixor means for addition to the luminance signals in the combining means to thereby provide vertically equalized luminance signals in which the amount of equalization is proportional to the amplitude of the undelayed line component signals.

18. Vertical aperture correction apparatus according to claim 1 further including amplifier means for amplifying the main component signal and the adjacent component signals to correct for signal attenuation introduced by the delay means, whereby the combined difference signals from said combining means corresponds substantially to only vertical detail information.

19. Vertical aperture correction apparatus according to claim 9, wherein said means for preventing the addition of vertical detail to the black and blacker-than-black amplitude portions of the main line component signal comprises means for coupling the vertical detail signal to ground in response to black and blacker-than-black amplitudes in the main line component signal.

20. Vertical aperture correction apparatus comprising means for separating television information signals fed thereto into a main line component signal and at least one coincidentally aligned adjacent line component signal, means responsive to both the at least one aligned line component signal and the main line component signal for providing a vertical detail signal representing differences in detail between vertically aligned portions of adjacent lines, means for supplying the main line component signal as a separate output signal, and means for combining the vertical detail content of the vertical detail signal with the separate output signal to enhance the vertical detail content therein.

References Cited

UNITED STATES PATENTS

| | | | |
|---|---|---|---|
| 2,899,495 | 8/1959 | Gibson et al. | 178—7.2 |
| 2,921,121 | 1/1960 | Grundmann et al. | 178 5.4 |
| 2,956,111 | 10/1960 | Sonnenfeldt | 178—5.4 |
| 2,971,053 | 2/1961 | Gibson | 178—7.2 |
| 2,989,587 | 6/1961 | Bedford | 178—7.2 |
| 3,377,425 | 4/1968 | Buzan | 178—7.1 |

RICHARD MURRAY, Primary Examiner

R. P. LANGE, Assistant Examiner

U.S. Cl. X.R.

178—5.2, 7.2

PO-1050
(5/69)

UNITED STATES PATENT OFFICE
CERTIFICATE OF CORRECTION

Patent No. 3,536,826 Dated October 27, 1970

Inventor(s) Renville H. McMann, Jr.

It is certified that error appears in the above-identified patent and that said Letters Patent are hereby corrected as shown below:

Column 4, lines 45-46, "microsecond" should be -- microseconds --; Column 5, line 72, delete "the" and insert -- to --; Column 9, line 73, "level" should be -- levels --; Column 10, line 28, "differencce" should be -- difference --; line 35, "substanitally" should be -- substantially --; line 65, after "wherein" insert -- the --; line 70, "deail" should be -- detail-line 73, after "to" delete "the"; Column 12, following line 46 the title "OTHER REFERENCES" should appear, after which the following publication should be listed:

Television Engineering Handbook - Fink, 1st Ed. 1957.

Signed and sealed this 6th day of July 1971.

(SEAL)
Attest:

EDWARD M.FLETCHER,JR.
Attesting Officer

WILLIAM E. SCHUYLER, JR.
Commissioner of Patents